United States Patent [19]

von Harpe et al.

[11] 4,223,099

[45] Sep. 16, 1980

[54] COPOLYMERIZABLE MOLDING COMPOSITIONS BASED ON UNSATURATED POLYURETHANES

[75] Inventors: Hannes von Harpe, Krefeld; Ludwig Bottenbruch, Krefeld; Bernd Peltzer, Krefeld; Leo Morbitzer, Cologne; Helmut Korber, Odenthal; Hansjochen Schulz-Walz, Krefeld, all of Fed. Rep. of Germany

[73] Assignee: Bayer Aktiengesellschaft, Leverkusen, Fed. Rep. of Germany

[21] Appl. No.: 970,225

[22] Filed: Dec. 15, 1978

Related U.S. Application Data

[63] Continuation-in-part of Ser. No. 873,425, Jan. 30, 1978, abandoned.

[30] Foreign Application Priority Data

Feb. 3, 1977 [DE] Fed. Rep. of Germany ....... 2704424
Feb. 19, 1977 [DE] Fed. Rep. of Germany ....... 2707230

[51] Int. Cl.² ............................................ C08L 75/00
[52] U.S. Cl. ...................................... 525/126; 525/66; 525/490; 525/455; 525/920
[58] Field of Search .................... 260/859 R; 525/126, 525/490, 455, 920

[56] References Cited

U.S. PATENT DOCUMENTS

| | | | |
|---|---|---|---|
| 3,641,199 | 2/1972 | Niederhauser | 260/859 R |
| 3,677,920 | 7/1972 | Kai | 260/859 R |
| 3,678,014 | 7/1972 | Suzuki | 260/859 R |
| 3,873,640 | 3/1975 | Owston | 260/859 R |
| 4,018,851 | 4/1977 | Baccei | 260/859 R |

*Primary Examiner*—Paul Lieberman
*Attorney, Agent, or Firm*—Connolly and Hutz

[57] ABSTRACT

Molding compositions comprising a "terminally unsaturated" polyurethane, a copolymerizable vinyl or vinylidene compound and a rubbery-elastic polymer having a glass transition temperature of between $-90°$ and $+10°$ C. can be used for the preparation of molded articles having a considerably increased impact strength and a good heat distortion temperature, strength and rigidity.

5 Claims, No Drawings

COPOLYMERIZABLE MOLDING COMPOSITIONS BASED ON UNSATURATED POLYURETHANES

This application is a continuation-in-part application of our application Ser. No. 873,425, filed Jan. 30, 1978, now abandoned.

The present invention relates to molding compositions based on "terminally unsaturated" polyurethanes, vinyl or vinylidene compounds which can be copolymerized with the latter and rubbery-elastic polymers.

Molding compositions comprising polyurethanes having random ethylenically unsaturated structural units, copolymerizable monomers and shrinkage-reducing thermoplastic polymers are known (German Offenlegungsschrift No. 2,448,929). Whilst cured molded articles produced from these molding compositions are of outstanding dimensional accuracy and have a high heat distortion point, they have, however, an impact strength which is not sufficient for all purposes.

Surprisingly, it has now been found that molded articles with a considerably increased impact strength, but, however, an only slightly reduced heat distortion point, can be obtained when certain "terminally unsaturated" polyurethanes are employed for mixtures of unsaturated polyurethanes, vinyl or vinylidene compounds which can be copolymerized with the latter and rubbery-elastic polymers.

"Terminally unsaturated" in the sense of the invention means that in each case the first carboxylic or dicarboxylic acid radical, counted from the both ends of the linear polymer chain, contains an ethylenically unsaturated double bond, whilst the rest of the molecule contains no further ethylenically unsaturated double bond.

"Terminally unsaturated" polyurethanes are known (German Patent Specification No. 925,499, U.S. Pat. No. 3,297,745 and German Offenlegungsschrift (German Published Specification) No. 2,542,314). Depending on the nature of their composition, they can be copolymerized with vinyl or vinylidene compounds to give rubbery-elastic, leathery or rigid, glassily transparent molded articles. With increasing impact strength, however, the heat distortion point is also considerably reduced here.

The present invention is based on the recognition that both the polyurethane and the rubbery-elastic polymer must fulfil quite definite conditions, it not being possible to achieve the desired properties of the molded articles produced from the molding compositions if these conditions are not maintained:

Prior to the curing, the molding compositions of the invention exist as a relatively low-viscous, clear mixture resp. a storage-stable dispersion and after the curing as a two-phase system having a glass transition temperature of between $-90°$ and $+10°$ C. for the rubbery phase and another glass transition temperature of between 50° and 250° C. for the resin phase which can be detected by the position of the loss modulus maxima of the complex elastic shear modulus as a function of temperature, measured at 1 Hz, or by particles which can be detected by electron microscopy with an average diameter of 0.1 to 100 μm.

The invention thus relates to molding compositions comprising (a) 5–77% by weight of a "terminally unsaturated" polyurethane, (b) 20–80% by weight of a vinyl or vinylidene compound which can be copolymerized with the latter and (c) 3–25% by weight of a rubbery-elastic polymer having a glass transition temperature between $-90°$ and $+10°$ C., wherein, after curing, a second phase should form as particles having an average diameter of 0.1 to 100 μm.

The data in percent relate to the sum of components (a), (b) and (c).

According to a preferred embodiment of the invention, the specific fracture surface energy of the copolymer of (a) and (b) (i.e. without component (c) being formed during hardening is $>0.6 \cdot 10^5$, preferably between $0.6 \cdot 10^5$ and $1.2 \cdot 10^6$, ergs/cm² (as measured at 25° C. by the method of L. J. Broutman, F. J. McGarry, J. Applied Polym. Sci. 9, 589 et seq. (1965)).

This preferred embodiment of the invention is obtained based on the constitution of (a) and (b) according to simple rules:

An increase of the density of cross-linkage in the a/b-copolymer, an increase of the amount of aromatic and/or cycloaliphatic groups and a decrease of the number of atoms between the terminal double bonds of the polyurethane (a) cause a reduction of the specific surface fracture energy. With the knowledge of these criteria, it is possible to obtain the preferred embodiment without any effort and in a reproducible manner—using the given components, even by only fixing the mixing ratio a:b—if necessary, after conducting a few pre-experiments.

The polyurethanes (a) can correspond to the following structural formula:

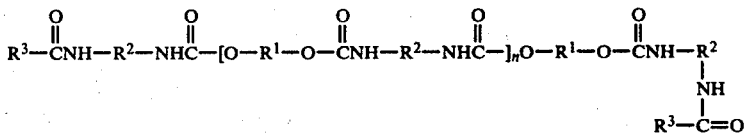

wherein
$R^1$ denotes an alkylene group with 2 to 8 C-atoms, a cycloalkylene or arylene group with 5 to 12 C-atoms, a mixed aliphatic/cycloaliphatic or a mixed aliphatic/aromatic divalent group with 7 to 24 C-atoms, it being possible for each of these groups to contain 1 to 3 oxygen atoms, or the divalent radical of a polyester reduced by two functional groups which polyester contains no $\alpha,\beta$-ethylenically unsaturated groups, $R^2$ denotes an alkylene group with 2 to 8 C-atoms, a cycloalkylene or arylene group with 6 to 12 C-atoms or a mixed aliphatic/cycloaliphatic or a mixed aliphatic/aromatic divalent group with 7 to 24 C-atoms, $R^3$ denotes

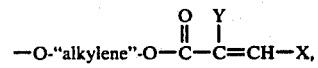

X denotes H, $CH_3$, COOH or COO—"alkylene"—OH;
Y denotes a hydrogen atom or a methyl group; and
"alkylene" denotes an alkylene group with 2 to 6 C atoms, and
n denotes zero or a number from 1 to 15.

In principle, the polyurethanes (a) can be prepared by two different multi-stage processes, namely (1) by reacting 1 mol of at least one organic diol with 1.05 to 2 mols of at least one organic diisocyanate to give a diisocyanate containing urethane groups and subsequently reacting 1 mol of the resulting compound containing terminal isocyanate groups with about the equivalent amount, preferably 1.9 to 2.2 mols, of at least one hydroxyalkyl ester of an $\alpha,\beta$-ethylenically unsaturated monocarboxylic acid or at least one mono- or bis-(hydroxyalkyl) ester of an $\alpha,\beta$-ethylenically unsaturated dicarboxylic acid, and (2) by reacting 1 mol of at least one organic diisocyanate with about the equimolar amount, preferably 0.95 to 1.1 mols, of at least one hydroxyalkyl ester of an $\alpha,\beta$-ethylenically unsaturated monocarboxylic acid or at least one mono- or bis-(hydroxyalkyl)ester of an $\alpha,\beta$-ethylenically unsaturated dicarboxylic acid to give an acid derivative containing isocyanate groups, and subsequently reacting 1.05 to 2 mols of the resulting acid derivative with 1 mol of at least one organic diol.

Thus the invention further relates to a process for the preparation of molding compositions, according to which 1 mol of at least one organic diol is reacted, in the first stage, with 1.05 to 2 mols of at least one organic diisocyanate in the melt, preferably at 100° to 120° C., or in at least one polymerizable vinyl or vinylidene compound, which is inert towards isocyanates, at elevated temperature, preferably at 60°–80° C., optionally in the presence of customary inhibitors, and 1 mol of the precursor, containing isocyanate groups thus obtained is reacted, in the second stage, with about the equivalent amount, preferably 1.9 to 2.2 mols, of at least one hydroxyalkyl ester of an $\alpha,\beta$-ethylenically unsaturated monocarboxylic acid or at least one mono- or bis-(hydroxyalkyl) ester of an $\alpha,\beta$-ethylenically unsaturated dicarboxylic acid, under conditions such as those which have been described above for the first stage, and 5–77% by weight of the "terminally unsaturated" polyurethane thus obtained are mixed with 20–80% by weight of a vinyl or vinylidene compound which can be copolymerized with the latter, 3–25% by weight of a rubbery-elastic polymer and optionally further auxiliaries and additives, the data in percent relating to the sum of components (a), (b) and (c).

Preferred organic diols for the preparation of the "terminally unsaturated" polyurethanes are, for example, dihydroxy compounds with 2–24 C-atoms, such as ethylene glycol, propane-1,2-diol and propane-1,3-diol, diethylene glycol, dipropylene glycol, butane-1,2-diol, butane-1,3-diol and butane-1,4-diol, neopentylglycol, 2-ethylpropane-1,3-diol, hexane-1,6-diol, 2,2-bis-(4-hydroxycyclohexyl)-propane, bisoxyalkylated bisphenol A and linear polyesters which contain hydroxyl groups and which are free from copolymerizable carbon-carbon multiple bonds.

Linear polyesters, containing hydroxyl groups, which are preferred diols for the preparation of "terminally unsaturated" polyurethanes are polycondensation products of aliphatic, cycloaliphatic and/or aromatic dicarboxylic acids with, as a rule, 2–16 C-atoms, or their ester-forming derivatives, and at least one diol with, as a rule, 2 to 24 C-atoms. These linear polyesters should have an average molecular weight (number average) of 150 to 3,000. Diols which can be used for the preparation of the linear polyesters are those mentioned in the above paragraph; preferred dicarboxylic acids are, for example, succinic acid, adipic acid, sebacic acid, phthalic acid, isophthalic and terephthalic acid, hexahydrophthalic or tetrahydrophthalic acid, endomethylenetetrahydrophthalic acid, tetrachlorophthalic acid and hexachloro-endomethylene tetrahydrophthalic acid.

Preferred organic diisocyanates for the preparation of the "terminally unsaturated" polyurethanes are those with 4 to 27 C atoms, such as, for example, toluylene-2,4- and -2,6-diisocyanate, m-phenylene diisocyanate, diphenylmethane-4,4'-diisocyanate, xylylene-1,3- and -1,4-diisocyanate, hexamethylene-1,6-diisocyanate, dicyclohexylmethane-4,4'-diisocyanate, 1-methylcyclohexane-2,4- and -2,6-diisocyanate, naphthylene-1,5-diisocyanate and dimerized or trimerized toluylene diisocyanate.

Polyisocyanates, the functionality of which has been reduced to two by reaction with reactive compounds, for example monohydric alcohols, are also considered diisocyanates in the sense of the invention.

Hydroxyalkyl esters of $\alpha,\beta$-ethylenically unsaturated monocarboxylic acids, which are preferred starting materials for the preparation of "terminally unsaturated" polyurethanes, are, for example, hydroxyalkyl esters of acrylic acid, methacrylic acid or crotonic acid, such as, for example, hydroxyethyl acrylate or methacrylate, hydroxybutyl acrylate or methacrylate or hydroxypropyl acrylate or methacrylate.

Preferred mono-(hydroxyalkyl) or bis-(hydroxyalkyl) esters of $\alpha,\beta$-ethylenically unsaturated dicarboxylic acids are, for example, reaction products of the above-mentioned diols and $\alpha,\beta$-ethylenically unsaturated dicarboxylic acids with 4 or 5 C atoms, or their anhydrides, such as, for example, maleic anhydride, fumaric acid or itaconic acid. Examples of the esters are 2-hyroxypropyl maleate or bis-(2-ethylhydroxypropyl) fumarate.

Preferred copolymerizable vinyl and vinylidene compounds in the sense of the invention are the unsaturated compounds which are customary in polyester technology and which preferably carry $\alpha$-substituted vinyl groups or $\beta$-substituted allyl groups, preferably styrene; but also, for example, nuclear-chlorinated and nuclear-alkylated or nuclear-alkenylated styrenes, it being possible for the alkyl and alkenyl groups to contain 1–4, resp. 2–4 carbon atoms, such as, for example, vinyltoluene, divinylbenzene, $\alpha$-methylstyrene, tert.-butylstyrenes and chlorostyrenes; vinyl esters of carboxylic acids with 2–6 carbon atoms, preferably vinyl acetate; vinylpyridine, vinylnaphthalene, vinylcyclohexane; acrylic acid and methacrylic acid and/or their esters (preferably the vinyl, allyl and methallyl esters) with 1–4 carbon atoms in the alcohol component, and their amides and nitriles, maleic anhydride, maleic acid mono- and diesters with 1–4 carbon atoms in the alcohol component, maleic acid mono- and diamides, or cyclic imides, such as N-methylmaleimide or N-cyclohexylmaleimide; and allyl compounds, such as allylbenzene and allyl esters, such as allyl acetate, phthalic acid diallyl ester, isophthalic acid diallyl ester, fumaric acid diallyl ester, allyl carbonates, diallyl carbonates, triallyl phosphate and triallyl cyanurate.

Preferred rubbery-elastic polymers are, for example, those based on natural rubber or synthetic rubber-like polymers, which are obtained, for example, from conjugated diolefines, such as butadiene, dimethylbutadiene or isoprene and its homologues, or copolymers of conjugated diolefines of this type with polymerizable vinyl or vinylidene compounds, such as styrene, $\alpha$-methylstyrene, acrylonitrile, methacrylonitrile, acrylates and methacrylates, thus, for example, acrylonitrile/butadiene rubbers, acrylate rubbers, chlorinated rubbers and acrylonitrile/butadiene/styrene copolymers (ABS); furthermore polyalkylene oxides, polylactones, such as polycaprolactone, and polylactams, such as polycaprolactam; saturated polyesters, polysilicones and polycarbonates, if they have rubber-like properties; but preferably ethylene copolymers and polyurethanes.

Preferred ethylene copolymers are copolymers of ethylene and vinyl esters of aliphatic saturated monocarboxylic acids having 1 to 18 carbon atoms, in particular vinyl acetate and -propionate, with a vinyl ester proportion of 10–90% by weight and a Mooney-viscosity of at least 5 Mooney (measured according to DIN 53,523), as well as graft polymers based on these polymers.

Preferred grafting monomers are vinyl-aromatic and vinylidene-aromatic compounds, such as vinyltoluene, α-methylstyrene, tert.-butylstyrene and chlorostyrenes, but preferably unsubstituted styrene itself, vinyl acetate, (meth)acrylic acid and their nitriles and esters, the alcohol component of which can contain 1–8 C atoms, such as, for example, methyl methacrylate or ethyl acrylate, (meth)acrylonitrile, maleic anhydride, maleic acid mono- and diesters with 1–8 C-atoms in the alcohol component, and isoprene. Mixtures of the compounds listed above can, of course, be used both as grafting substrates and as grafting monomers. The preferred polymers include, furthermore, products containing vinyl alcohol, which can be prepared by partial saponification of the ethylen/vinyl ester copolymers listed or of the graft polymers, and products containing hydroperoxide groups, which can be prepared by oxidizing the substance listed. The above-mentioned graft polymers can be prepared according to known processes.

The graft polymers of ethylene/vinyl ester copolymers with grafted units of an aromatic vinyl compound and (meth)acrylonitrile used according to the invention may be prepared by the process disclosed in British Patent Specification No. 917,499 or German Offenlegungsschrifts No. 1 964 479 (≙ British Patent Specification No. 1,282,120) and No. 2,137,780 (≙ British Patent Specification No. 1,315,637).

The preferred graft polymers of ethylene/vinyl ester copolymers which contain grafted units of a mixture of aromatic vinyl compounds, (meth)acrylonitrile and α-olefins containing 2–18 carbon atoms may be prepared by the processes according to German Offenlegungsschrift No. 2 215 880 (≙ U.S. patent application Ser. No. 344,544) or German Offenlegungsschrift No. 2 305 681.

The vinyl esters for the preparation of the ethylene/-vinylester graft basis may be vinyl esters of saturated aliphatic monocarboxylic acids containing 1–18 carbon atoms or cycloaliphatic or aromatic monocarboxylic acids containing 7–11 carbon atoms, any of which monocarboxylic acids may be substituted with halogen, in particular with chlorine. The following are mentioned as being preferred: vinyl formate; vinyl acetate; vinyl propionate; vinyl chloropropionate; vinyl butyrate; vinyl isobutyrate; vinyl caproate; vinyl laurate; vinyl myristate; vinyl stearate and vinyl benzoate. Vinyl acetate is particularly preferred.

The ethylene/vinyl ester copolymers are prepared by known methods of high- or medium-pressure synthesis, optionally in solvents such as tertiary butanol.

Preferred aromatic vinyl compounds for grafting on the graft polymers are, for example, styrene, alkyl styrenes which are substituted in the nucleus and contain 1–5 carbon atoms in the alkyl group, such as 4-methyl styrene, α-methyl styrene, halogenated styrenes such as 4-chlorostyrene or mixtures thereof. Styrene is preferred.

The grafted monolefines may contain 2–18 carbon atoms and preferably contain 2–8 carbon atoms.

The following are preferred examples of monoolefines which may be used: Ethylene, propylene, butene-1, butene-2, isobutylene, 2-methylbutene-2, 3-methylbutene-1, diisobutylene, triisobutylene, pentene-1, 4-methyl-pentene-1, octadecene-1 and cyclopentene. Propylene, butene-1, isobutylene or mixtures thereof are particularly preferred.

The rubbery-elastic polyurethanes c are preferably linear and have average molecular weights of between 10,000 and 1,000,000, preferably between 20,000 and 500,000 (determined by membrane osmosis). The preparation of these polyurethanes can be done by reacting a compound having at least two isocyanate-reactive groups, particularly a polyhydroxyl compound having a molecular weight >600, optionally a compound containing two isocyanate-reactive H-atoms and a molecular weight <600, and a polyisocyanate.

The starting materials for the preparation of the rubbery-elastic polyurethanes c include aliphatic, cycloaliphatic, araliphatic, aromatic and heterocyclic polyisocyanates, such as those described, for example, by W. Siefken in Justus Liebigs Annalen der Chemie 562, pages 75 to 136, for example ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and any mixtures of these isomers; 1-methyl-2.4- and -2.6-diisocyanato-cyclohexane; 1-isocyanato-3,3,5-trimethyl-5-isocyanatomethylcyclohexane as described in German AuslegeschriftNo. 1 202 785 and U.S. Pat. No. 3,401,190; 2,4- and 2,6-hexahydrotolylene diisocyanate and any mixtures of these isomers; hexahydro-1,3- and/or -1,4-phenylene diisocyanate; perhydro-2,4- and/or -4,4'-diphenylmethane diisocyanate; 1,3- and 1,4-phenylenediisocyanate; 2,4- and 2,6-tolylene diisocyanate and any mixtures of these isomers; diphenylmethane-2,4'- and/or 4,4'-diisocyanate; 4,4'-diphenylpropane diisocyanate; naphthylene-1,5-diisocyanate, triphenylmethane-4,4',4''-triisocyanate; polyphenyl-polymethylene polyisocyanates of the kind which can be obtained by aniline/formaldehyde condensation followed by phosgenation and which habe been described, for example, in British Patent Specification No. 874,430 and No. 848,671, m- and p-isocyanatophenyl-sulphonylisocyanates according to U.S. Pat. No. 3,454,606; perchlorinated aryl polyisocyanates such as those described e.g. in German Auslegeschrift No. 1 157 601 and U.S. Pat. No. 3,277,138; polyisocyanates containing carbodiimide groups as described in German Patent Specification No. 1 092 007 and U.S. Pat. No. 3,152,162; diisocyanates of the kind described in U.S. Pat. No. 3,492,330, polyisocyanates having allophanate groups as described e.g. in British Patent Specification No. 994,890; Belgian Patent Specification No. 761 626 and published Dutch patent application No. 7 102 524; polyisocyanates having isocyanurate groups as described e.g. in U.S. Pat. No. 3,001,973; German Patent Specifications Nos. 1 022 789; 1 222 067 and 1 027 394 and in German Offenlegungsschrifts Nos. 1 929 034 and 2 004 048; polyisocyanates with urethane groups, e.g. as described in Belgian Patent Specification No. 752 261 and U.S. Pat. No. 3,394,164; polyisocyanates having acylated urea groups according to German Patent Specification No. 1 230 778; polyisocyanates with biuret groups as described e.g. in German Patent Specification No. 1 101 394; U.S. Pat. Nos. 3,124,605 and 3,201,372 and British Patent Specification No. 889,050; polyisocyanates prepared by telomerization reactions as described e.g. in U.S. Pat. No. 3,654,106; polyisocyanates with ester groups, for example those mentioned in British Patent specifications Nos. 965,474 and 1,072,956; U.S. Pat. No. 3,567,763 and German Patent Specification No. 1,231,688; reaction products of the above mentioned isocyanates with acetals according to German Patent Specification No. 1,072,385 and polyisocyanates containing polymeric fatty acid groups according to U.S. Pat. No. 3,455,883.

The distillation residues containing isocyanate groups obtained from the commercial production of isocyanates may also be used, if desired as solutions in one or more of the above mentioned polyisocyanates. Any mixtures of the above mentioned polyisocyanates may also be used.

It is generally preferred to use commercially readily available polyisocyanates, for example 2,4- and 2,6-tolylene diisocyanate and any mixtures of these isomers ("TDI"), polyphenyl-polymethylene polyisocyanates which can be prepared by aniline/formaldehyde condensation followed by phosgenation ("crude MDI") and polyisocyanates wich have carbodiimide groups, urethane groups, allophanate groups, isocyanurate groups, urea groups or biuret groups ("modified polyisocyanates").

Furthermore, the preferred starting materials include compounds having at least two isocyanate-reactive hydrogen atoms and generally a molecular weight of between 600 and 10,000; i.e. compounds having amino, thiol and/or carboxyl groups, preferably polyhydroxyl compounds, particularly those having two to eight hydroxyl groups, especially those having 2 hydroxyl groups and a molecular weight of between 800 and 10,000, preferably between 1000 and 6000, e.g. polyesters, polyethers, polythioethers, polyacetals, polycarbonates, polyamides and polyesteramides, having at least two, generally two to eight, preferably two hydroxyl groups, such as those known per se for the production of non-cellular and cellular polyurethanes.

Preferred polyhydroxyl compounds having a molecular weight of above 600 are linear or mainly linear polyesters and polyethers.

These higher molecular weight hydroxyl polyesters which are preferred as polyhydroxyl compounds include e.g. reaction products of polyhydric, preferably dihydric alcohols and polybasic, preferably dibasic carboxylic acids. Instead of free polycarboxylic acids, the corresponding polycarboxylic acid anhydrides or polycarboxylic acid esters of $C_1$ to $C_6$ alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated.

The following are mentioned as preferred examples: Succinic acid; adipic acid; pimelic acid, suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid, dimeric and trimeric fatty acids such as oleic acid which may be mixed with monomeric fatty acids; dimethyl terephthalate and terephthalic acid bis-(glycol ester).

Preferred polyhydric alcohols include e.g. ethylene glycol; 2-ethylpropane diol-(1.3), propylene glycol-(1,2) and -(1,3); diethylene and dipropylene glycol; butylene glycol-(1,4), -(1,3) and -(2,3); pentanediol-(1,5); hexanediol-(1,6); octane-diol-(1,8); neopentylglycol; cyclohexanedimethanol (1,4-bis-hydroxymethylcyclohexane); 2-methyl-1,3-propanediol; glycerol; trimethylolpropane; hexanetriol-(1,2,6); butanetriol-(1,2,4); trimethylolethane; pentaerythritol; triethylene glycol; tetraethylene glycol; polyethylene glycols; polypropylene glycols; dibutylene glycol and polybutylene glycols. The polyesters may also contain a proportion of carboxyl end groups. Polyesters of lactones, e.g. ε-caprolactam, or linear hydroxycarboxylic acids having at least 5 carbon atoms, e.g. ω-hydroxycaproic acid, may also be used.

The polyesters have to be prepared under such conditions that their end groups comprise at least more than 50% hydroxyl groups. Other polyhydroxyl compounds are polyethers, e.g. propylene oxide or tetrahydrofurane polymers or polythioethers, e.g. condensation products of thiodiglycol itself or of thiodiglycol and other diols. These products generally have an average molecular weight of about 600 to 5000, preferably 1000 to 2500.

The polyethers containing at least two, generally from 2 to 8, preferably two, hydroxyl groups which may be used in accordance with the present invention are also known and are obtained, for example, by the polyaddition of epoxides, such as ethylene oxide, propylene oxide, butylene oxide, tetrahydrofuran, styrene oxide or epichlorohydrin, on their own, for example in the presence of $BF_3$, or by the chemical addition of these epoxides, optionally in admixture or in succession, with starter components containing reactive hydrogen atoms, such as water, ammonia, alcohols, amines, for example methanol, ethanol, ethylene glycol, 1,3- or 1,2-propylene glycol, dihydroxyl diphenyl propane, 1,4- or 2,3-butylene glycol, 1,6-hexane diol, 1,8-octane diol, neopentyl glycol, 1,4-bis-(hydroxymethyl)-cyclohexane, 2-methyl-1,3-propanediol, glycerol, 1,2,6-hexanetriol, 1,2,4-butane triol, trimethylol ethane, pentaerythritol, phenol, resorcinol, isononyl phenol, hydroquinone, 1,2,2-tris-(hydroxyphenyl)-ethane, methylamine, ethylene diamine, tetra- or hexamethylene diamine, diethylene triamine, ethanolamine, di- and triethanolamine, aniline, phenylene diamine, 2,4-and 2,6-diamino toluene and polyphenyl/polymethylene polyamines of the type obtained by condensing aniline with formaldehyde.

In many cases, it is preferred to use polyethers of the type which predominantly contain primary OH groups (up to 90%, by weight, based on all the OH groups present in the polyether). Polyethers modified by vinyl polymers of the type obtained, for example, by the polymerization of styrene and acrylonitrile in the presence of polyethers (U.S. Pat. Nos. 3,383,351; 3,304,273; 3,523,093 and 3,110,695, German Pat. No. 1,152,536) are also suitable.

Among the polythioethers, particular reference is made to the condensation products of thiodiglycol with itself and/or with other glycols, dicarboxylic acids, formaldehyde, amino carboxylic acids or amino alcohols. Depending upon the co-components, these products are polythio mixed ethers, polythioether esters or polythioether ester amides.

Preferred polyacetals are, for example, those compounds which may be obtained from glycols, such as diethylene glycol, triethylene glycol, 4,4'-dioxethoxy diphenyl dimethyl methane and hexane diol by reaction with formaldehyde. Polyacetals suitable for the purposes of the present invention may also be obtained by polymerizing cyclic acetals.

Preferred polycarbonates containing hydroxyl groups are those known compounds obtainable, for example, by reacting diols, such as 1,3-propane diol, 1,4-butane diol and/or 1,6-hexane diol, diethylene glycol, triethylene glycol and tetraethylene glycol, with diaryl carbonates, for example diphenyl carbonate, or with phosgene.

Preferred examples of the polyester amides and polyamides are the predominantly linear condensates obtained from polybasic, saturated or unsaturated carboxylic acids and the anhydrides thereof and polyfunctional saturated and unsaturated amino alcohols, diamines, higher polyamines and mixtures thereof.

Polyhydroxyl compounds already containing urethane or urea groups and optionally modified natural polyols, such as castor oil or carbohydrates, such as starch, may also be used. Addition products or alkylene oxides with phenol/formal-resins or with urea/formaldehyde resins may also be used in accordance with the present invention.

Representatives of these compounds used in accordance with the present invention are described, for example, in High Polymers, Vol., XVI, "Polyurethanes, Chemistry and Technology", by Saunders-Frisch, Interscience Publishers, New York, London, Vol, I, 1962, pages 32 to 42 and pages 44 to 54, and Vol. II, 1964, pages 5–6 and 198–199, and in Kunststoff-Handbuch, Vol. VII, Vieweg-Höchtlen, Carl Hanser-Verlag, Munich, 1966, for example on pages 45 to 71.

It is, of course, also possible to use mixtures of the above-mentioned compounds containing at least two isocyanate-reactive hydrogen atoms and having a molecular weight of from 600 to 10,000, for example mixtures of polyethers and polyesters.

Other starting components which may optionally be used in accordance with the present invention for producing the elastomeric polyurethanes are compounds containing at least two isocyanate-reactive hydrogen atoms and having a molecular weight of from 32 to 600. In this case, too, the compounds in question are compounds containing hydroxyl groups and/or amino groups and/or amino groups and/or thiol groups and/or carboxyl groups, preferably compounds containing hydroxyl groups and/or amino groups which are used as chain-extenders. These compounds generally contain from 2 to 8, preferably 2, isocyanate-reactive hydrogen atoms.

In addition to water or simple glycols, glycols containing urea, urethane, carbonamide or ester groups and glycols containing tertiary nitrogen atoms are mentioned as compounds containing at least two isocyanate-reactive hydrogen atoms and having a molecular weight below 600 (chain extenders). It is also possible to use glycols containing aromatic ring systems, for example, 1,5-naphthylene-$\beta$-dioxethylether or hydroquinone-$\beta$-dioxethyl ether. Diamines, such as o-dichlorobenzidine, 2,5-dichloro-p-phenylene diamine or 3,3'-dichloro-4,4'-diamino-diphenylmethane are also preferred, as are aminoalcohols, such as N-allylethanolamine, amino- or hydroxy-carboxylic acids.

Preferred examples of such compounds include: water, ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, trimethylol ethane, pentaerythritol, diethylene glycol, triethylene glycol, tetraethylene glycol, higher polyethylene glycols having a molecular weight of up to 600, dipropylene glycol, higher polypropylene glycols having a molecular weight of up to 600, dibutylene glycol, higher polybutylene glycol having a molecular weight of up to 600, 4,4'-dihydroxy diphenyl propane, bis-hydroxy methyl hydroquinone, ethanolamine, diethanolamine, triethanolamine, 3-aminopropanol, ethylene diamine, 1,3-diaminopropane, 1-mercapto-3-aminopropane, 4-hydroxy- or -aminophthalic acid, succinic acid, adipic acid, hydrazine, N,N'-dimethyl hydrazine, 4,4'-diaminodiphenyl methane, tolylene diamine, methylene-bis-chloraniline, methylene-bis-anthranilic acid ester, diaminobenzoic acid esters and the isomeric chlorophenylene diamines.

In this case, too, it is possible to use mixtures of different compounds containing at least two isocyanate-reactive hydrogen atoms and having a molecular weight of from 32 to 600.

According to the present invention, it is also possible to use polyhydroxyl compounds containing high molecular weight polyadducts or polycondensates in finely dispersed or dissolved form. Such modified polyhydroxyl compounds are obtained by carrying out polyaddition reactions (for example reactions between polyisocyanates and aminofunctional compounds) or polycondensation reactions (for example between formaldehyde and phenols and/or amines) directly in situ in the above-mentioned compounds containing hydroxyl groups. Such processes are described, for example, in German Auslegeschrifts Nos. 1,168,075 and 1,260,142 and in German Offenlegungsschrifts Nos. 2,324,134; 2,423,984; 2,512,385; 2,513,815; 2,550,796; 2,550,797; 2,550,833 and 2,550,862. However, it is also possible, in accordance with U.S. Pat. No. 3,869,413 and German Offenlegungsschrift No. 2,550,860, to mix an aqueous polymer dispersion with a polhydroxyl compounds and consequently to remove the water from this mixture.

The rubber-like polyurethane elastomers preferably used in accordance with the present invention may be produced by reacting the polyhydroxyl compounds having a molecular weight above 600 with less than the equivalent quantity of a diisocyanate, based on the terminal groups, adding the compound containing two reactive hydrogen atoms and having a molecular weight below 600 and completing the reaction by the addition of more diisocyanate. However, it is also possible to react the polyhydroxyl compounds with an excess of diisocyanates over and above the quantity required for reaction with the terminal groups and to measure the quantity in which the compound having a molecular weight below 600 is used in such a way that an excess over and above the quantity based on the isocyanate groups still present is obtained. The mixture of the polyhydroxyl compound having a molecular weight about 600 and the compound having a molecular weight below 600 may, of course, also be reacted with an excess of diisocyanates.

The molding compositions according to the invention can be prepared by dispersing the rubber-elastic polymers in a mixture of the "terminally unsaturated" polyurethane and the copolymerizable vinyl or vinylidene compound at 20 to 80° C. It is, of course, also possible to disperse the rubbery-elastic polymer in the copolymerizable compound at 20 to 80° C., and to mix this dispersion with a dispersion of the "terminally unsaturated" polyurethane in the copolymerizable compound.

In order to prevent premature gelation, polymerization inhibitors may be added to the molding compositions according to the present invention in the conventional quantities, e.g. from 0.001 to 0.1%, by weight, based on the sum of components (a), (b) and (c). Examples of preferred polymerization inhibitors include: hydroquinone and alkylated hydroquinones, such as toluhydroquinone, dimethyl hydroquinone, trimethyl hydroquinone or p-t-butyl hydroquinone, p-t-butyl pyrocatechol, p-benzo-quinone, chloranil, naphthoquinone, copper compounds, such as copper naphthenate or copper octoate, addition compounds of Cu(I) halides with phosphites, such as Cu(I)Cl/triphenyl phosphite, Cu(I)Cl/trimethyl phosphite, Cu(I)Cl/tris-chlorethyl phosphite or Cu(I)Cl/tripropyl phosphite, phenols or phenol derivatives, such as 4,4'-bis-(2,6-di-t-butyl-phenol), 1,3,5-trimethyl-2,4,6-tris-(3,5-di-t-butyl-4-hydroxybenzyl)-benzene or 4,4'-butylidene-bis-(6-t-butyl-m-cresol), secondary aryl amines, such as phenyl-β-naphthylamine or 4,4'-bis-(α,α-dimethylbenzyl)-diphenylamine, phenothiazines, p-nitrosodimethyl aniline and other stabilizers of the type described in "Methoden der organischen Chemie" (Houben-Weyl), 4th Edition, Vol. XIV/1, pages 433-452, 756, Georg-Thieme-Verlag, Stuttgart, 1961.

Polymerization initiators may be added to the molding compositions according to the present invention before hardening in the conventional quantities, preferably in quantities of from 0.5 to 5%, by weight, based on the sum of components (a), (b) and (c). Examples of preferred polymerization initiators include: diacyl peroxides, such as diacetyl peroxide, dibenzoyl peroxide, di-p-chlorobenzoyl peroxide, t-butyl peroxide, peroxy esters, such as t-butyl peroxy acetate, t-butyl peroxy benzoate, t-butyl peroctoate, dicyclohexyl peroxy dicarbonate or 2,5-dimethyl hexane-2,5-diperoctoate, alkyl peroxides, such as bis-(t-butylperoxy butane), dicumly peroxide, t-butyl cumyl peroxide, hydroperoxides, such as cumene hydroperoxide, t-butyl hydroperoxide, cyclohexanone hydroperoxide, methylethyl ketone hydroperoxide, perketals, acetal acetone peroxide or azoiso-butyrodinitrile.

Fillers and reinforcing materials may be added to the resin compositions produced in accordance with the present invention generally in quantities of up to 300%, by weight, preferably from 50 to 200%, by weight, based on the sum of components (a), (b) and (c). Preferred fillers and reinforcing materials include: inorganic materials such as heavy spar, calcium carbonate, silicates, aluminas, chalk, lime, carbon, asbestos, glass and metals, and organic materials, such as cotton, sisal, jute, polyesters and polyamides, preferably in the form of fibers. Glass fibers in any form, particularly in the form of mats, are preferably used as reinforcing materials.

In order to reduce the polymerization shrinkage which occurs during hardening, it is also possible to add to the compositions known shrinkage-reducing additives, such as thermoplastic polymers, polycondensates or polyaddition compounds.

The various components of the molding compositions according to the present invention are best mixed in kneaders, dissolvers or even on roll stands.

In addition, it is, of course, possible, if desired, to add inorganic or organic pigments, dyes, lubricants and release agents, such as zinc stearate, thixotropic agents, and UV-absorbers, in the conventional quantities.

The molding compositions according to the invention can be cured under normal pressure or under a pressure of 3 to 300 kp/cm$^2$, at about 70 to 180° C. In addition, curing is also possible at 15°-25° C., using accelerators, such as, for example, amines or cobalt salts. Molded articles of all types can be produced from the molding compositions, such as, for example, containers, parts for vehicle bodies and machine covers.

The data in percent given in the examples which follow denote percent by weight and the parts denote parts by weight.

EXAMPLES

Preparation of the rubbery-elastic polymers

The ethylene/vinyl ester copolymers, containing hydroperoxide groups, used in the molding compositions according to the invention are prepared by the following process:

The ethylene/vinyl ester copolymer is oxidized at 90°-150° C., preferably at 110°-120° C., with air or with a gas containing oxygen under a pressure of 10-100 bars, preferably 30-50 bars, in an extruder.

The graft copolymers, based on ethylene/vinyl ester copolymers, used in the molding compositions according to the invention were prepared through an extruder: after the melting zone, hydroperoxide groups were prepared in the oxidation zone, as described above, by atmospheric oxidation and these act as a starter for the grafting copolymerization after the monomers to be grafted have been added. After the polymerization zone of 9 to 13 diameters, the residual monomer was removed in a devolatilization zone of 6-9 diameters and the graft copolymer was extruded. The entire process section of the grafting reaction screw had a length of 30-42 diameters, preferably 38 diameters.

Characterization of the elastomeric modifiers of Examples 1 to 6

Ethylene copolymers

| Description | A | B | C | D | E | F | G |
|---|---|---|---|---|---|---|---|
| Vinyl acetate (% by weight) | 45 | 70 | 70 | 70 | 45 | 70 | 78.4 |
| Mooney viscosity (Mooney) | 20 | 27 | 75 | 47 | 34 | 28 | 17 |
| Hydroperoxide (ppm) | 1,570 | 1,140 | — | 1,280 | — | 960 | — |
| Styrene (% by weight) | — | — | — | — | 15 | — | — |
| Acrylonitrile (% by weight) | — | 2 | — | — | — | — | — |
| Vinyl alcohol (% by weight) | — | — | — | — | — | — | 3.6 |

Polyurethane elastomers:
Polyurethane H

Molecular weight $\overline{M}n$ (determined by membrane osmosis):107 00, Glass transition temperature: −28° C.

Prepared from 100 g of adipic acid/propane diol-1.2/ethylene glycol polyester (molar diol ratio 2:8, hydroxyl number 56.5), 206 g of 4,4'-diisocyanato-diphenylmethane and 35.5 g of butane diol-1.4.

Polyurethane J

Molecular weight $\overline{M}n$ (determined by membrane osmosis): 76800, Glass transition temperature: −34° C.

Prepared from 100 g of adipic acid/hexane diol-1.6/neopentyl glycol polyester (molar diol ratio 2:1, hydroxyl number 56,2), 206 g of 4,4'-diisocyanato-diphenylmethane and 33 g of butane diol-1.4.

EXAMPLE 1

688 g (2 mols) of propoxylated bisphenol A in 652 g of styrene are added gradually to 522 g (3 mols) of toluylene-2,4-diisocyanate and 0.2 g of hydroquinone at 80° C., whilst stirring intensively and passing air through. The reaction is continued under the same conditions, until the isocyanate content has fallen to one third of the initial value (determination according to DIN 16,945). 260 g (2 mols) of hydroxyethyl methacrylate are then added and the reaction is continued until an isocyanate conversion of 98–99% is achieved. The finished product is adjusted to a solids content of 50% with styrene, whereupon a viscosity of 600–650 mPa.s results.

In order to prepare the molding compositions according to the invention, the particular amounts of granular elastomeric modifier are stirred into the styrene solution of the polyurethane at 50° C., whilst passing air through, whereupon a stable dispersion is obtained.

The curing of the molding compositions according to the invention to give sheets is carried out, after adding 3 parts of benzoyl peroxide paste (50% strength in dibutyl phthalate), for 3 hours at 75° C. Thereafter, the sheets are additionally heated for 15 hours at 90° C. The resulting sheets are used to prepare standard small bars for measuring the impact strength and the heat distortion point according to Martens. The corresponding values in the table below show the influence of the elastomers on the impact strength.

| Ethylene copolymer | Proportion (%) | Impact strength (kJ/m$^2$) | Heat distortion point according to Martens (°C.) |
|---|---|---|---|
| — | — | 18 | 82 |
| A | 12 | 33 | 82 |
| B | 15 | 67 | 52 |
| A } C | 7.5 } 7.5 | } 40 | } 68 |
| E | 12 | 35 | 82 |

EXAMPLE 2

344 g (1 mol) of propoxylated bisphenol A in 445 g of styrene are added gradually to 500 g (2 mols) of a diphenylmethane diisocyanate isomer mixture and 0.1 g of hydroquinone at 80° C., whilst stirring intensively and passing air through. The reaction is continued under the same conditions until the isocyanate content has fallen to half the initial value (determination according to DIN 16,945). 260 g (2 mols) of hydroxyethylene methacrylate are then added and the reaction is continued until the isocyanate conversion is 98–99%. The finished product is adjusted to a solids content of 50% with styrene, whereupon a viscosity of 200–250 mPa.s results.

The preparation of the dispersion of the styrene solution of the polyurethane and the elastomeric modifier and the curing of the mixture are carried out in the manner described in Example 1. The following values for the impact strength and the heat distortion point of the cured products are found:

| Ethylene copolymer | Proportion (%) | Impact Strength (kJ/m$^2$) | Heat distortion point according to Martens (°C.) |
|---|---|---|---|
| — | — | 19 | 86 |
| B | 15 | 68 | 60 |
| E | 12 | 30 | 86 |

EXAMPLE 3

344 g (1 mol) of propoxylated bisphenol A in 373 g of styrene are added gradually to 348 g (2 mols) of toluylene-2,4-diisocyanate and 0.11 g of hydroquinone at 80° C., whilst stirring intensively and passing air through. The reaction is carried out under the same conditions until the isocyanate content has fallen to half the initial value. 260 g (2 mols) of hydroxyethyl methacrylate are then added and the reaction is continued until the isocyanate conversion is 98–99%. The finished product is adjusted to a solids content of 50% with styrene, whereupon a viscosity of 180–220 mPa.s results.

The preparation of the dispersion of the styrene solution of the polyurethane and the elastomer as well as the curing of the mixture are carried out as described in Example 1. The following values for the impact strength and the heat distortion point of the cured products were obtained:

| Ethylene copolymer | Proportion (%) | Impact strength (kJ/m$^2$) | Heat distortion point according to Martens (°C.) |
|---|---|---|---|
| — | — | 20 | 87 |
| B | 15 | 42 | 67 |
| D | 15 | 56 | 67 |
| F | 15 | 42 | 72 |
| D E | 8 4 | 44 | 71 |

EXAMPLE 4

378 g of a saturated polyester (for the preparation see below) of isophthalic acid and propylene glycol, with predominantly hydroxylic end groups, in 878 g of styrene are added gradually to 500 g (2 mols) of a diphenylmethane diisocyanate isomer mixture and 0.14 g of hydroquinone at 80° C., whilst stirring intensively and passing air through. The reaction is continued under the same conditions until the isocyanate content (determination according to DIN 16,945) has fallen to half the starting value. 260 g (2 mols) of hydroxyethyl methacrylate are then added and the reaction is continued until the isocyanate conversion is 98–99%. The finished product is adjusted to a solids content of 50% with styrene, whereupon a viscosity of 200–250 mPa.s results.

The saturated polyester is prepared by subjecting 166 g of isophthalic acid and 190 g of propane-1,2-diol to a melt condensation reaction at 150° to 200° C. under nitrogen, down to an acid number of less than 2. Unreacted propylene glycol is then distilled off in vacuo. The resulting saturated polyester has the following characteristic values:

| | |
|---|---|
| Acid number (mg of KOH/g) | 0.3 |
| OH number (mg of KOH/g) | 297 |
| Molecular weight (measured as the number-average by vapor pressure osmometry) | 450 |
| Viscosity (mPa.s) | $7.5 \times 10^6$ |

The preparation of the dispersion of the styrene solution of the polyurethane and the elastomeric modifier and the curing thereof are carried out as described in Example 1. The following values for the impact strength and the heat distortion point result:

| Ethylene copolymer | Proportion (%) | Impact Strength (kJ/m$^2$) | Heat distortion point according to Martens (°C.) |
|---|---|---|---|
| — | — | 16.5 | 88 |
| G | 15 | 49 | 71 |

EXAMPLE 5

241 g (1 mol) of a saturated polyester (for the preparation see below) of terephthalic acid and propylene glycol, with predominantly hydroxylic end groups, in 589 g of styrene are added gradually to 348 g (2 mols) of toluylene-2,4-diisocyanate and 0.18 g of hydroquinone at 80° C., whilst stirring intensively and passing air through. The reaction is continued under the same conditions until the isocyanate content (determination according to DIN 16,945) has fallen to half the starting value. 260 (2 mols) of hydroxyethyl methacrylate are then added and the reaction is continued until the isocyanate conversion is 98–99%. The finished product is adjusted to a solids content of 50% with styrene, whereupon a viscosity of 180–220 mPa.s results.

The saturated polyester is prepared by reacting 194 g of dimethylterephthalate with 190 g of propane-1,2-diol at 150° to 200° C. under nitrogen, down to an acid number of less than 2. Unreacted propylene glycol is then distilled off in vacuo. The resulting saturated polyester has the following characteristic values:

| | |
|---|---|
| Acid number (mg of KOH/g) | 0.5 |
| OH number (mg of KOH/g) | 465 |
| Molecular weight (measured as the number-average by vapour pressure osmometry) | 330 |
| Viscosity (mPas) | $3.8 \times 10^3$ |

The preparation of the mixture of the styrene solution of the polyester-urethane and the elastomeric modifier and the curing thereof are carried out as described in Example 1. The following values for the impact strength and the heat distortion point result:

| Elastomeric modifier | Proportion (%) | Impact strength (kJ/m$^2$) | Heat distortion point according to Martens (°C.) |
|---|---|---|---|
| — | — | 16 | 96 |
| H | 15 | 52 | 88 |
| J | 15 | unbroken | 76 |

EXAMPLE 6

482 g (2 mols) of a saturated polyester (for the preparation see Example 5) of terephthalic acid and propylene glycol, with predominantly hydroxylic end groups, in 1,000 g of styrene are added gradually to 522 g (3 mols) of toluylene-2,4-diisocyanate and 0.2 g of hydroquinone at 80° C., whilst stirring intensively and passing air through. The reaction is continued under the same conditions until the isocyanate content (determination according to DIN 16,945) has fallen to half the starting value. 260 g (2 mols) of hydroxyethyl methacrylate are then added and the reaction is continued until the isocyanate conversion is 98–99%. The finished product is adjusted to a solids content of 50% with styrene, whereupon a viscosity of 900–1,000 mPa.s results.

The preparation of the mixture of the styrene solution of the polyester-urethane and the elastomeric modifier and the curing thereof are carried out as described in Example 1. The following values for the impact strength and the heat distortion point result:

| Elastomeric modifier | Proportion (%) | Impact strength (kJ/m$^2$) | Heat distortion point according to Martens (°C.) |
|---|---|---|---|
| — | — | 17 | 94 |
| H | 12 | 75 | 87 |

The specific fracture surface energies of the copolymers formed from the unsaturated polyurethanes (a) and styrene (b) are:

| Example | ergs/cm$^2$ |
|---|---|
| 1 | $3 \times 10^5$ |
| 2 | $1.9 \times 10^5$ |
| 3 | $1.2 \times 10^5$ |
| 4 | $2.8 \times 10^5$ |
| 5 | $1.2 \times 10^5$ |
| 6 | $2.7 \times 10^5$ |

What we claim is:
1. A molding composition comprising:
(a) 5 to 77% by weight of a polyurethane of the formula

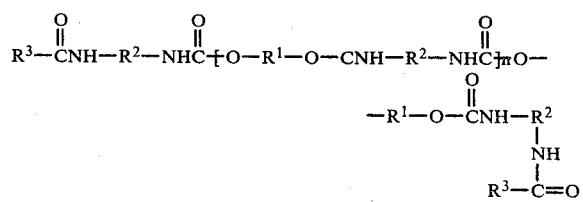

wherein
R$^1$ is alkylene with 2 to 8 carbon atoms, cycloalkylene or arylene with 5 to 12 carbon atoms, a mixed aliphatic/cycloaliphatic or a mixed aliphatic-/aromatic divalent group with 7 to 24 carbon atoms, each of these groups may also contain 1 to 3 oxygen atoms, or a divalent radical of a polyester which contains no $\alpha,\beta$-ethylenic unsaturations, $R^2$ is alkylene with 2 to 8 carbon atoms, cycloalkylene or arylene with 6 to 12 carbon atoms or a mixed aliphatic/cycloaliphatic or a mixed aliphatic/aromatic divalent group with 7 to 24 carbon atoms, $R^3$ is

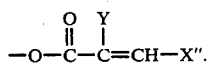

X is H, $CH_3$, COOH or COO—"alkylene"—OH,
Y is hydrogen or methyl,
"alkylene" is alkylene with 2 to 6 carbon atoms, and
n is zero or a number from 1 to 15;

(b) 20 to 80% by weight of a vinyl or vinylidene compound copolymerizable with (a); and (c) 3 to 25% by weight of a rubbery-elastic polymer;

wherein the composition percentages are based on the sum of the weights of components (a), (b) and (c); and wherein said composition, upon curing, yields a two-phase system comprising a rubbery phase containing said rubbery-elastic polymer and having a glass transition temperature of between $-90°$ and $10°$ C. and a resin phase having a glass transition temperature of between $50°$ and $250°$ C., the discontinuous phase having an average particle diameter of 0.1 to 100 $\mu$m; and wherein the specific fracture surface energy of the resulting copolymer phase of (a) and (b), without (c), being formed during hardening will be greater than $0.6 \times 10^5$ ergs per square centimeter.

2. A molding composition according to claim 1, in which the copolymer phase has a fracture surface energy of between $0.6 \cdot 10^5$ and $1.2 \cdot 10^6$ ergs/cm$^2$.

3. A process for the production of a molding composition as claimed in claim 1, in which 1 mol of at least one organic diol is reacted, in the first stage, with 1.05 to 2 mols of at least one organic diisocyanate in the melt, or in a polymerizable vinyl or vinylidene compound, which is inert towards isocyanates, at elevated temperature, and 1 mol of the precursor, containing isocyanate groups, thus obtained is reacted, in the second stage, with about the equivalent amount of at least one hydroxyalkyl ester of an $\alpha,\beta$-ethylenically unsaturated monocarboxylic acid or of at least one mono- or bis-(hydroxyalkyl) ester of an $\alpha,\beta$-ethylenically unsaturated dicarboxylic acid, under the conditions which have been described above for the first stage, and 5 to 77% by weight of the "terminally unsaturated" polyurethane thus obtained are mixed with 20 to 80% by weight of a vinyl or vinylidene compound which can be copolymerized with the latter, 3 to 25% by weight of a rubbery-elastic polymer and optionally further auxiliaries and additives, percentages by weight relating to the sum of components (a), (b) and (c).

4. A process according to claim 3, in which in the second stage, the precursor is reacted with 1.9 to 2.2 moles of at least one hydroxyalkyl ester of an $\alpha,\beta$-ethylenically unsaturated monocarboxylic acid or at least one of the mono- or bis-(hydroxyalkyl) ester of an $\alpha,\beta$-ethylenically unsaturated dicarboxylic acid.

5. A composition when produced by a process as claimed in claim 3.

* * * * *